Figure 1:
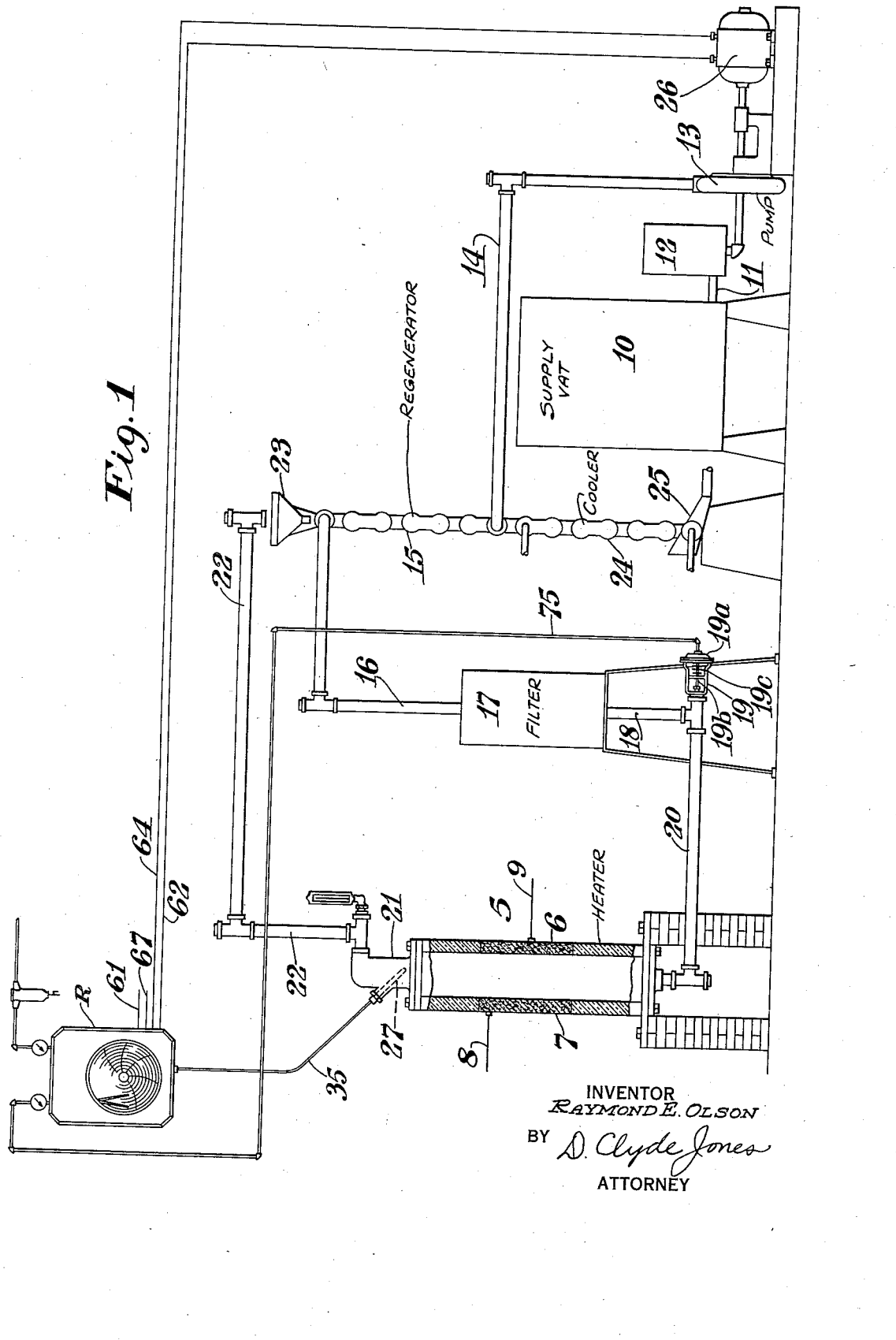

Aug. 27, 1935.  R. E. OLSON  2,012,728
HEAT EXCHANGE SYSTEM
Filed Jan. 16, 1934  2 Sheets-Sheet 1

INVENTOR
RAYMOND E. OLSON
BY D. Clyde Jones
ATTORNEY

Aug. 27, 1935.   R. E. OLSON   2,012,728
HEAT EXCHANGE SYSTEM
Filed Jan. 16, 1934   2 Sheets-Sheet 2
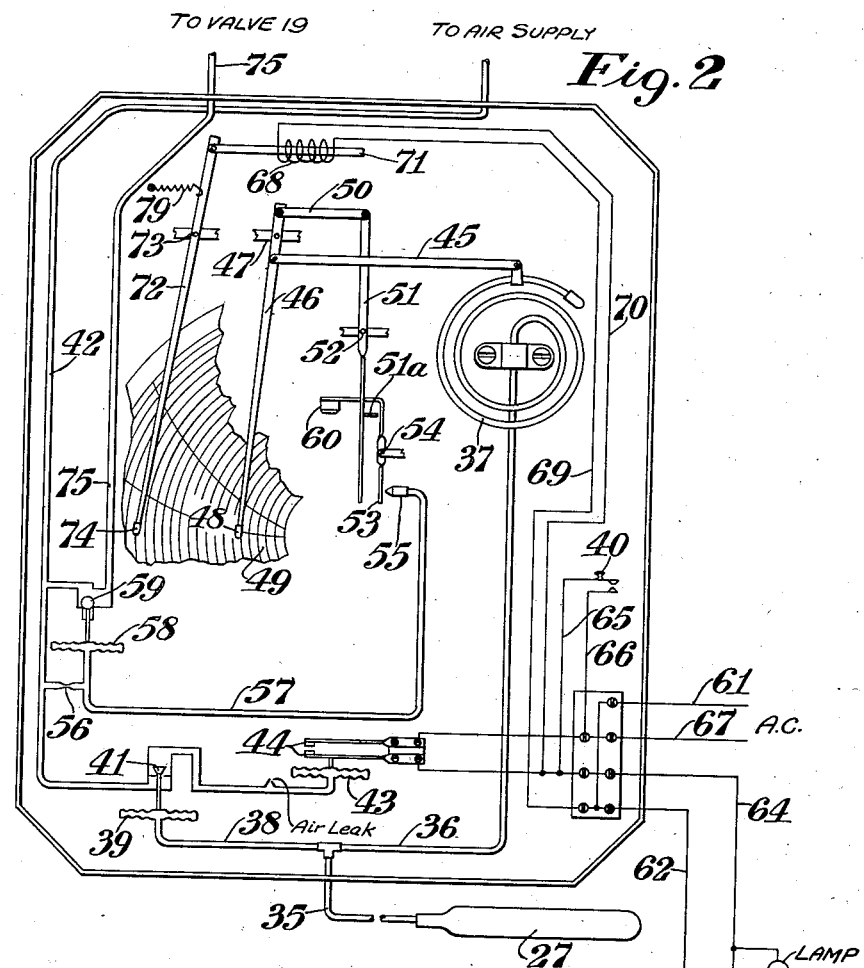
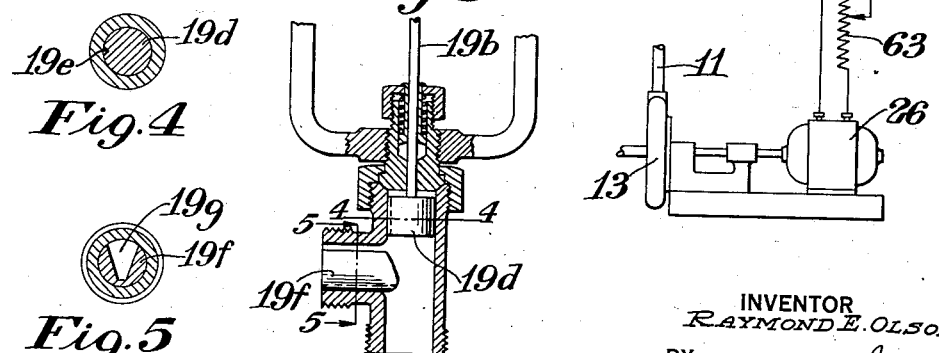
INVENTOR
RAYMOND E. OLSON
BY D. Clyde Jones
ATTORNEY Patented Aug. 27, 1935

2,012,728

UNITED STATES PATENT OFFICE 2,012,728

HEAT EXCHANGE SYSTEM

Raymond E. Olson, Rochester, N. Y., assignor to Taylor Instrument Companies, Rochester, N. Y., a corporation of New York Application January 16, 1934, Serial No. 706,801

2 Claims. (Cl. 236—20)

This invention relates to a heat exchange system and more particularly to a method of and to apparatus for controlling the temperature of a liquid heated in a heat exchange system.

In one type of heat exchange system it has been proposed to maintain a predetermined temperature of the liquid at the outlet of the system, in spite of changes in the rate of flow therethrough or wide variations in the temperature of the liquid entering the heater, by varying the amount of heat introduced into the system in response to variations in said outlet temperature.

It has also been proposed to heat a liquid in a heat exchange system to a predetermined temperature by supplying a fixed amount of heat to the liquid being heated and varying the rate of flow of the liquid through the system in accordance with the temperature of this liquid after it is heated, by regulating the speed of the pump for forcing the liquid through the system. In such an arrangement where the speed of the pump is varied in accordance with the temperature of the outgoing liquid, elaborate control mechanism is required but in spite of such mechanism, the resulting control of the temperature has not been as uniform as desired.

In accordance with the present invention, a novel method of heating a liquid in a heater to a predetermined temperature, is provided in which a fixed amount of heat is supplied to the liquid while varying the rate of flow of the liquid to the heater from a source of the liquid under a substantially uniform head or pressure. Specifically the invention relates to a milk heater of the type in which a fixed amount of heat is supplied thereto, and in which a milk pump in the milk supply pipe to the heater is operated at a predetermined fixed speed to supply milk at a predetermined pressure to a conduit leading to said heater, said conduit having a valve therein, the opening or closing of which is effected to vary the rate of milk flow in accordance with the temperature of the heated milk, that is, the temperature of the milk discharged from the heater.

These and other features of the invention will appear from the detailed description and claims when taken with the drawings in which Fig. 1 is a diagrammatic showing of a milk pasteurizing system according to the present invention wherein the milk heater or pasteurizer is shown partially in section; Fig. 2 is a diagrammatic showing of a recording regulator which includes equipment for controlling the opening and closing of the valve in the milk supply pipe leading to the heater, and which also includes mechanism whereby the motor of the milk pump is stopped whenever the milk discharged from the heater is below the predetermined temperature; and Figs. 3, 4 and 5 are detail sectional views of a valve in the milk supply pipe leading to the heater, Fig. 4 being a section taken on the line 4—4 of Fig. 3 and Fig. 5 being a section taken on the line 5—5 also of Fig. 3.

Referring especially to Fig. 1, 5 indicates a rectangular milk heater or pasteurizer of the type having two exposed carbon plates or other electrodes 6 and 7 mounted in the walls thereof. These electrodes are electrically insulated from each other but are respectively connected by conductors 8 and 9, to a source of uniform current, not shown. It is unnecessary to describe further the construction of this heater except to state that it operates by reason of the inherent electrical resistance of the milk to the passage of current between electrodes 6 and 7 for heating the milk, so that in the normal operation of this pasteurizer a fixed predetermined amount of heat is thus supplied to the milk passing therethrough.

In this system, milk from the supply tank 10 flows through pipe 11 into the surge tank 12 from which it is forced at a uniform pressure by the pump 13 through the pipe 14 and the coils of the upper regenerative portion 15 of the combined regenerator and cooler. From the regenerator the milk flows through pipe 16, filter 17, pipe 18, thence through the valve generally designated 19, and pipe 20 to the bottom of the heater 5. The milk then passes between the electrodes 6 and 7 of the heater where it is heated and flows through the discharge outlet 21 of the heater to pipe 22 which discharges the milk into an elongated funnel 23. From this funnel the heated milk flows over the outside of the coils of the regenerator 15, through which the cold milk is supplied to the heater, so that some of the heat from the heated milk is transferred to the incoming cool milk. The heated milk thereafter flows over the outside of the cooling coils 24 of the cooler (said coils being cooled by cooling medium circulating therethrough) to the trough 25 from which it may be pumped to a holding tank or to a bottle-filling machine (not shown). It should be mentioned that the pump 13 is driven at a constant speed by the motor 26, (the circuit of which will be hereafter described) so that a fixed pressure or head of milk exists in the pipe 14 and through the remaining portion of the system as far as the valve 19. Thus there is milk under a predetermined pressure in a portion of the circulating system so that by operating the valve 19, the rate of milk flow to the heater can be varied at will without varying the speed of the pump 13 or the motor 26 which drives it.

In the present arrangement, the valve 19 is a pressure-fluid operated valve controlled by a regulating device generally designated R, the operation of which is determined by a thermo-sensitive element or bulb 27 in the discharge outlet 21 of the heater.

The valve 19 has an expansible diaphragm top or expansible chamber 19a operating on the application of pressure fluid thereto, to move the valve stem 19b toward the valve-closing position against the action of a spring 19c which tends to maintain the valve open. The details of this valve are further shown in Figs. 3, 4 and 5. The valve stem 19b is illustrated as carrying a valve disc 19d which, as best shown in Fig. 4, has a notch 19e cut in its side so that it permits a small amount of milk to flow therethrough, even when the valve is fully closed. The valve disc 19d cooperates with a plug element 19f mounted in the valve body which element has a V-shaped port 19g therein, so that the area of the port uncovered by the valve disc is proportional to the movement of the disc.

The regulating device apart from the valve 19 includes the thermo-sensitive bulb 27 which communicates through a conduit 35 and a branched conduit 36 with the Bourdon spring 37. This spring, in turn, controls the operation of the regulating valve 19 and also moves a pen arm 46 and its stylus 48 to make a record of the temperature of the heated milk on a chart 49, as will be more fully set forth hereafter. Conduit 35 also communicates through the branch conduit 38 with a capsular diaphragm or metal bellows 39. This bellows by means of valve 41 controls the operation of the bellows 43 which, in turn, effects the closure of contacts 44 in the mentioned circuit of motor 26. The bulb 27, the Bourdon spring 37 and the capsular diaphragm 39, as well as the mentioned conduits, constitute what is known in the art as a tube system and may be filled with a temperature responsive vapor or liquid in accordance with the usual practice.

The regulating device also includes a second pen arm 72 carrying a stylus 74 and mechanism for causing said pen arm and stylus to make a record on chart 49 of the operating and non-operating condition of the pump 13. The various details of the regulating device will be set forth in the course of the description of the operation of the system.

With this brief description of the apparatus, the invention will best be understood by describing the method of controlling the pasteurization of milk. In starting the system in operation, the push button switch 40 is manually depressed to complete a circuit for operating the motor 26 which drives pump 13. This circuit may be traced from one side of the alternating current source, conductors 61, 62, winding of the motor 26, the adjustable rheostat 63 for adjusting the speed of the motor, conductors 64, 65, push button switch springs 40, conductors 66 and 67, to the other side of the alternating current source. It will be noted that the lamp 68, which may be located at any convenient position for observation, is connected in multiple with the motor 26 to serve as an indication that the motor is operating the pump to force milk through the system.

There is also provided in multiple with these last-described circuits a branch conduit for energizing the solenoid 68 which operates the second pen arm 62. This circuit extends from the conductor 62, conductor 69, winding of the solenoid 68, conductor 70 and thence to conductor 64. By this circuit arrangement, the solenoid 68 is energized whenever the motor is operated and on energization it attracts its core 71 to move the upper end of the second pen arm in a clockwise direction against the action of spring 79. This pen arm is pivoted at 73 and at its free end is provided with a stylus 74 which draws a curve in one direction on the chart 49 due to the action of solenoid 68 indicating when the motor and its pump are started and draws the curve in opposite direction due to spring 79 on the deenergization of solenoid 68 when the motor and its pump are stopped.

It is necessary for the operator to hold the switch 40 closed until such time as the temperature of the milk about the bulb 27 in the discharge outlet 21 of the heater reaches the predetermined value. When the milk has been heated to this temperature, the filling medium in the bulb 27 and the attached tube system causes the capsular diaphragm 39 to expand which, in turn, opens the valve 41. This permits air or other fluid under pressure to flow from a pressure-fluid source through the conduit 42, valve 41 and thence to the capsular diaphragm 43. This diaphragm expands and by so doing closes the electrical contacts 44 which complete a circuit in shunt of the contacts of the push-button switch 40 so that the circuit for the pump motor is thus maintained closed automatically as long as the milk in the outlet 21 of the milk heater is at, or above, the predetermined temperature. Also when the medium in the tube system expands on a rise in temperature, the Bourdon spring 37 unwinds and thereby tends to move the link 45 toward the left. This link which is connected to the pen arm 46 pivotally mounted at 47 on the frame of the instrument, in turn, moves the upper end of this pen arm clockwise, causing its pen or stylus 48 to draw a temperature curve on the graduated chart 49 driven in accordance with time by a suitable clock motor (not shown). The upper end of the pen arm 46 is connected by a link 50 to the upper end of a baffle-actuating arm 51 pivoted at 52 in the case. The baffle-actuating arm when thus moved clockwise, swings away from the lower end of a baffle 53. This baffle pivoted at 54 on a part of the case, is normally forced by the weight 60 toward a nozzle 55 from which there constantly flows a jet of air or pressure-fluid supplied thereto from the supply conduit 42 through restriction or orifice 56 and conduit 57. As the temperature of the milk about the bulb 27 approaches the predetermined value, the Bourdon spring 37 continues to unwind, thereby moving the link 45 further toward the left, as shown in Fig. 2. This movement of the link further, swings the upper end of the pen arm 46 in a clockwise direction causing the stylus 48 to continue making a temperature record on chart 49. The pen arm also causes the link 50 connected thereto, to swing the lower end of the baffle actuating arm 51 toward the left, as shown. When the milk in the outlet 21 of the heater 5 is at the predetermined value, the baffle-actuating arm will begin to move away from the baffle 53 so that the weight 60 attached to the upper end of this baffle causes the lower end thereof to approach the nozzle 55.

This approach of the baffle toward the nozzle results in an increase in pressure in the conduit 57 with the result that the capsular diaphragm 58 expands. The expansion of this diaphragm causes the valve 59 to close when the predetermined temperature is exceeded, thereby shutting off the flow of pressure fluid from the conduit 42 to the conduit 75. Thus the pressure in the diaphragm top 19a of the valve is relieved and the spring 19c raises the valve disc 19d to permit an increased rate of milk flow through the pipe 20 to the heater 5.

If the temperature of the milk about the bulb 27 in the outlet 21 of the heater drops to the predetermined temperature, then the Bourdon spring 37 will tend to wind up. This action moves the link 45 toward the right, with the result that the upper ends of the pen arm 46 and the baffle-actuating arm 51 are moved counter-clockwise. As a result of this movement, the lower end of the baffle-actuating arm 51 moves counterclockwise and the pin 51a thereon, swings the baffle 53 away from the nozzle 55. This permits the pressure in conduit 57 to drop, so that the capsular diaphragm 58 collapses slightly to open valve 59. With the valve 59 thus opening, the pressure-fluid flows from the source, through conduits 42 and 75 to the diaphragm top 19a. The increased pressure in this diaphragm top moves the valve disc 19d to cover a portion of port 19g so that the rate of flow through the pipe 20 is reduced. Thus the valve 19 operates under the control of the regulator R to maintain such a flow of milk to the heater that the milk is heated to substantially the exact desired temperature.

If for any reason the temperature of the milk drops below the predetermined value which is unsuitable for pasteurizing purposes, the capsular diaphragm 39 will collapse to close its valve 41. On this closure of this valve, the capsular diaphragm 43 also collapses to open the contacts 44 in the circuit of the pump motor 26. Thus the motor 26 will immediately stop and the pumping of milk through the system will cease. Since the solenoid 68 operates the pen arm 72 on energization to swing the pen 74 toward the outer margin of the chart 43 when the pump 13 is being operated, and since the spring 74 tends to swing this pen toward the center of the chart when the pump is idle, the movement of the pen 74 draws an accurate record on the chart of the periods during which the pump 13 is in operation and also when it is stopped.

Under extremely adverse operating conditions, it is desirable to replace the valve 19 with the dual response regulating unit shown in Fig. 1 of the copending application of Hubbard and Clarridge S. N. 696,650, filed Nov. 4, 1933.

I claim:

1. In a system for heating milk to a predetermined temperature, a heater having a substantially constant heat input, a source of milk to be heated, piping for connecting said source to said heater, means including a pump driven at constant speed for forcing milk through said piping from said source to said heater, a thermosensitive device responsive to the temperature of said milk after it has been heated, means including a valve in said piping controlled by said thermosensitive device for varying the rate of flow of said milk through said piping, and means actuated by said thermosensitive device for stopping said pump whenever the temperature of the milk at the outlet of said heater drops below a predetermined value.

2. In a system for heating milk to a predetermined temperature, a heater having a substantially constant heat input, a source of milk to be heated, piping for connecting said source to said heater, means including a pump driven at constant speed for forcing milk through said piping from said source to said heater, a thermosensitive device responsive to the temperature of said milk after it has been heated, means including a valve in said piping controlled by said thermosensitive device for varying the rate of flow of said milk through said piping, said valve being arranged always to permit at least a small amount of milk to pass therethrough, and means actuated by said thermosensitive device for stopping said pump whenever the temperature of the milk at the outlet of said heater drops below a predetermined value.

RAYMOND E. OLSON.